Jan. 2, 1968  R. A. PEARSON  3,360,843
LABEL MACHINE

Filed June 24, 1965  12 Sheets-Sheet 1

Fig. 1

INVENTOR.
REINHOLD A. PEARSON
BY Wells & St.John
ATTYS.

INVENTOR.
REINHOLD A. PEARSON
BY
ATTYS.

Jan. 2, 1968  R. A. PEARSON  3,360,843
LABEL MACHINE
Filed June 24, 1965  12 Sheets-Sheet 7

INVENTOR.
REINHOLD A. PEARSON
BY
ATTYS.

INVENTOR.
REINHOLD A. PEARSON

United States Patent Office 3,360,843
Patented Jan. 2, 1968

3,360,843
LABEL MACHINE
Reinhold A. Pearson, S. 12 Division,
Spokane, Wash. 99202
Filed June 24, 1965, Ser. No. 470,319
5 Claims. (Cl. 29—208)

ABSTRACT OF THE DISCLOSURE

A label machine for placement of labels in the shape of conical frustrums about the tapering necks of bottles. The apparatus is coordinated with a conveyor mechanism that locates a group of bottles in a line. A plurality of vacuum cups are pivoted by a dual lever system between the position at which the cups engage the outermost labels in nested stacks of labels and a position over the bottles from which the labels can be wiped onto the respective necks. In addition, the feed apparatus for the labels includes a cam to wedge the remainder of the nested labels in a stack so as to free the outermost label for removal and a brush that moves with the vacuum cups and sweeps across the labels after placement on the necks of the bottles.

---

This is a continuation-in-part of application Ser. No. 414,370, Nov. 27, 1964, now abandoned.

This invention relates to a machine for placing of labels about the necks of bottles, the labels having a tapered sleeve configuration.

The machine described in the following specification relates to the placement of sleeve type labels about the necks of bottles such as those used in the beverage industry, although the invention is obviously not limited to any particular type of industry. Such labels are used for promotional devices or as identifying labels. One such application of labels has been used to cover a particular trademark imprinted on a glass bottle and to substitute therefor a printed paper label for a related product. Glass bottles commonly have long tapered necks, so that the sleeve label applied by the present machine can fit snugly about the neck. It may or may not be secured to the bottle by adhesive.

It is a first object of this invention to provide a machine that can automatically place such labels about the necks of bottles as the bottles pass by the machine on a conveyor. The machine does not require grouping of the bottles in specific rows, but can be placed along a conventional single file conveyor on which bottles are transferred from one station to another.

Another object of this invention is to provide such a device that can place such labels with great accuracy, removing each label from a nested stack and sweeping it downwardly along the neck of a bottle to insure its proper reception on the bottle surface.

Another object of this invention is to provide such a machine with completely automatic controls to cyclically place labels on bottles on a conveyor whose bottle movement is interrupted in a timed sequence relative to the apparatus that handles the labels.

These and further objects will be evident from the following description, taken together with the accompanying drawings which illustrate a preferred form of the invention. It is to be understood that this form of the invention is not intended to limit the invention itself to any precise physical structure, but is set out only as an example of the claimed apparatus.

In the drawings:

FIGURES 9 through 12 are diagrammatic views illustrating the operation of the machine;

The basic machine is shown in detail in the accompanying drawings. It involves three interrelated mechanisms. The first is a feed mechanism for the labels to place the outer label in each nested stack of labels at a predetermined location on the fixed supporting framework so that it can be mechanically grasped and moved as desired. The second feature is a mechanical arrangement to individually grasp the outer labels in each stack and transfer them to the necks of bottles on a passing conveyor. The third feature involves automatic controls for interrelating the movement of bottles on the conveyor with the operation of the apparatus for placing the labels. The entire operation is totally automatic.

Before proceeding with a description of the machine, it is necessary to briefly describe the bottles and labels with which the machine is concerned. The type of bottle on which the label is placed will obviously vary from one industry to another. As an example the apparatus shown has been used in the soft drink industry to place a covering label about the long tapered necks of bottles on which labels are printed directly on the glass. In this manner, one special bottle can be used to sell several related products.

The bottles shown in the drawings, designated by the numeral 8, are rather tall bottles with a tapered neck that enlarges toward its base. The labels shown in the drawings, designated individually by the numeral 9, are in the shape of a conical frustrum. The tapered shape of the label is preferably complementary to the tapered shape of the neck on the bottle 8. As shown in the drawings, the labels 9 in practice are not exactly circular as received from the manufacturer. This is due solely to the fact that the labels are commonly manufactured by cutting off the tip of conical paper cups. This cutting action collapses the label slightly and modifies the cross-sectional shape of the label, although the label actually is formed with a circular cross section. For purposes of the present machine, either type of cross section can be handled with equal ease, and minor variations in the cross-sectional configuration are not detrimental.

Figure 5:
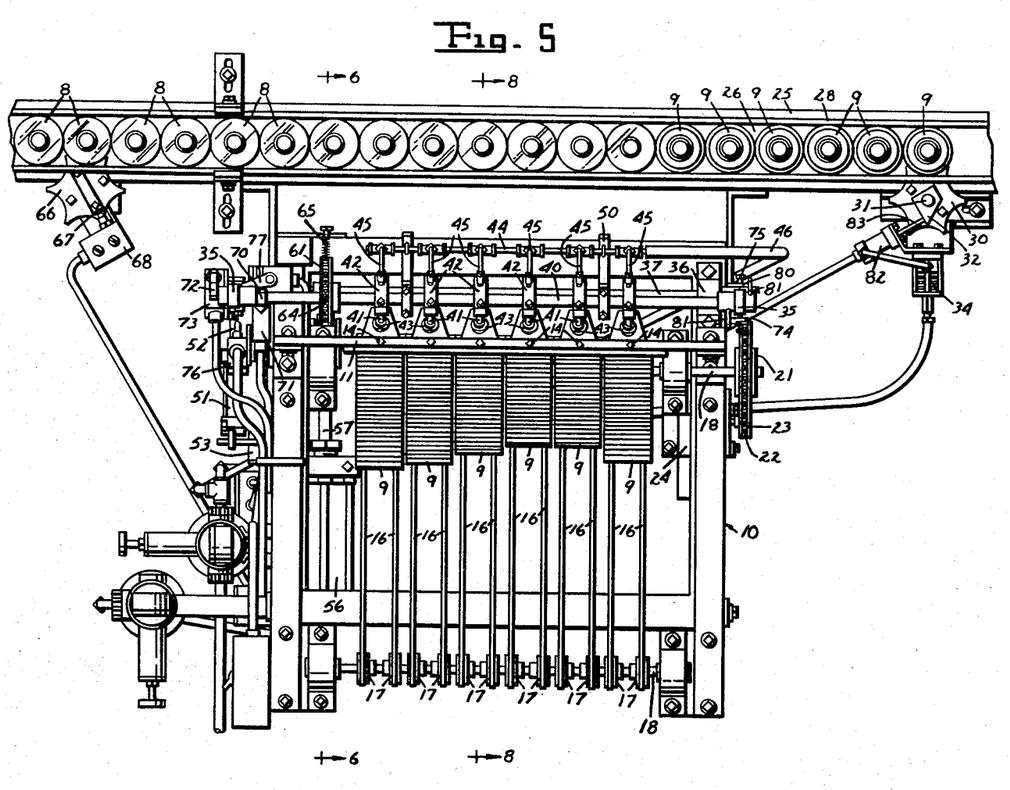
FIGURE 5 is a top view of the apparatus shown in FIGURE 1.

The rigid supporting framework on which the various devices to be described are supported is designated generally in the drawings by the numeral 10. The end of the machine shown to the left in FIGURE 2 and at the top of FIGURE 5 shall be designated as the rear of the machine, since the stacked labels 9 are moved from this end toward the bottom of the machine as shown in FIGURE 5, which shall be designated as its front end. Likewise, the side of the machine shown in FIGURE 2 and located to the left in FIGURE 5 shall be designated as the left side of the machine, while the opposite side, shown in FIGURE 3, shall be referred to as the right side of the machine.

Feed mechanism

At the rear of the machine and located at a fixed position on the framework 10 is an upright die 11. The die 11 is merely an upright rectangular plate containing a series of spaced apertures 12 having a circular cross section. The interior diameter of each aperture 12 is equal to the maximum exterior diameter of the label 9 which is to pass through it. The purpose of the apertures 12 is to accurately locate the position of the label 9 that are received through them.

The number of apertures 12 in the die 11 will depend upon the number of stacks of labels 9 that are to be handled by a particular machine. The illustrative apparatus shown in the drawings handles six stacks of nested labels 9, and therefore the die 11 is provided with six apertures 12. The number of apertures 12 and therefore stacks of nested labels 9 will depend upon the required top speed of the machine as designated by the number of bottles that must pass along the adjacent conveyor over a given length of time. The greater the number of stacks of labels 9 handled by a particular machine, the greater will be its potential capacity in placing labels over bottles during a given time.

Each aperture 12 is provided with a longitudinally aligned sharp knife edge 13 (FIGURE 9) which is located relative to the die 11 by means of a threadably engaged bolt 14. The longitudinal knife blade 13 in each die aperture 12 cuts each label and serves to frictionally resist movement of all other labels in a particular stack other than the outside label 9 which is to be fed through the die aperture 12.

The stacks of nested labels 9 are moved toward the die 11 by means of paired belts 16 engaged about longitudinally spaced pulleys 17. The pulleys 17 are mounted on front and rear shafts 20, 18, which are rotatably journalled on the framework 10 by bearings at the respective sides of the framework 10. The rear shaft 18 is powered by means of a sprocket 21 at the right of the machine. The sprocket 21 is engaged by a driving chain 22 enmeshed over a driving sprocket 23 at the side of a motor transmission unit 24 on the framework 10. The belts 16 are frictional rubber belts and are driven continuously by the motor transmission unit 24. Since the belts 16 frictionally engage each label 9 in the nested stack of labels, each label 9 is constantly urged toward the aperture 12 in the die 11 with which that particular stack of labels 9 is aligned. The application of force by the belt 16 to each label in a nested stack of labels 9 prevents the labels from becoming bunched along the stack and insures proper and even feeding of labels to the rear of the machine. It also is advantageous to have the belts 16 freely open to the top as shown, so that additional labels can be added to the nested stack without interrupting the operation of the machine in any manner.

At the rear edge of the die 11 and directly along the bottom surface of each aperture 12 is a curved support plate 15 having an upper surface complementary to the lower outside surface of the outer label 9 protruding through the aperture 12. This plate serves to properly locate the label 9, preventing it from tilting one way or the other and also provides a pressure member so that pressure by a vacuum cup on the top of the label 9 will not cause the label to collapse or be moved from proper alignment.

Transfer apparatus

The machine shown in the drawings transfers the outer label 9 in each nested stack of labels to the neck of a bottle 8 on an adjacent single file bottle conveyor. The conveyor itself is conventional in manufacture and is not shown in detail except as is necessary for an understanding of this apparatus. It is carried on a supporting longitudinal framework 25. On the framework 25 rest moving plates 26 joined by a lower driving chain 27. The plates 26 frictionally support the bottles 8 that are to move along the length of the conveyor. Longitudinal guide rods 28 are provided to prevent the bottles from falling from the plates 26.

The framework 10 is preferably fixed to the framework 25 of the bottle conveyor on which the bottles 8 pass. As shown in the drawings, the bottles 8 will move from left to right.

It is necessary to intermittently interrupt the movement of the bottles in order that the labels 9 can be properly placed over their necks. This is accomplished by a first star wheel 30 rotatably journalled on the framework 25 of the conveyor for movement about the vertical axis. The star wheel 30 is six sided, its periphery having six indentations complementary to the surface of the bottles 8 which are receivable therein. The star wheel 30 is freely rotatable relative to the framework 25. However, fixed to the shaft 31 on which the star wheel 30 is fixed is a radially projecting finger 32 (FIGURE 5). The finger 32 is adapted to be abutted by a plunger 83 mounted in a cylinder 82. Cylinder 82 is controlled by a solenoid actuated valve 34. When not retracted by activation of valve 34, the plunger 83 is spring biased outwardly so that it intersects the path of rotation of the finger 32 and prevents further rotation of the star wheel 30.

As can be seen in FIGURE 5, retraction of plunger 83 will allow the start wheel 30 to be rotated by the motion of the bottles 8 which are continuously urged in a direction from left to right by the constantly moving conveyor plates 26. The star wheel 30 will complete one full revolution before the finger 32 will again abut the projecting plunger 83. Thus, each activation of the solenoid valve 34 will permit six bottles to pass the center of the star wheel 30. The location of the star wheel 30 relative to framework 25 on which it is fixed is such that six bottles at the center of the machine will be respectively aligned with the six stacks of nested labels 9. Since the bottles 8 are stopped by the star wheel 30, they will abut one another, and the separation between the centers of the bottles will be constant due to the uniformity of the bottle configurations. The spacing of the apertures 12 in the die 11 will therefore be identical to the spacing from center to center of adjacent bottles on the conveyor.

The apparatus by which the outer label 9 is placed about the neck of bottle 8 will now be described. This apparatus primarily utilizes two lever systems. The first lever system is movable from a location adjacent the exposed or outer label 9 in a die 11 to a position adjacent to the bottle 8. The second lever system is mounted on the first lever system and is movable from a position at which it engages the individual labels 9 in the die 11 to a second position at which it is elevated above the necks of the bottles 8. Basically, the labels are pulled outwardly from the stacks of nested labels and elevated to a location above the top elevation of the bottles 8. The labels are then swung outwardly and over the conveyor and then down over the necks of the bottles 8, the downward movement of the labels being used to securely place them about the complementary necks of the bottles 9. The apparatus then automatically returns to its starting position to engage another group of exposed labels in the nested stacks.

The first lever system comprises upstanding arms 35 that are movable between a position adjacent to the conveyor and a position adjacent to the nested labels. The arms 35, located at the respective sides of the machine, are pivotally carried on the framework 10 at their lower ends by means of fixed bearings 36 and a transverse shaft 37 rotatably journalled in the respective bearings 36. At the outer ends of the shaft 37 are respectively fixed a pair of adjustable brackets 38 which carry the two upwardly extending arms 35.

Figure 8:
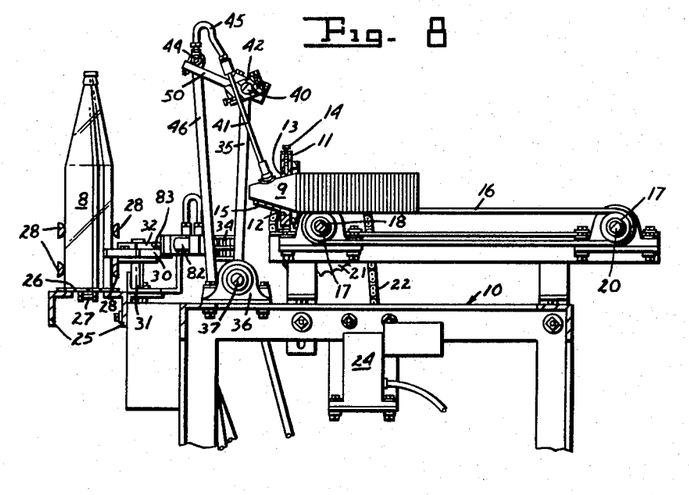
FIGURE 8 is a fragmentary sectional view taken along line 8—8 in FIGURE 5.

The top end of each arm 35 rotatably journals a cross shaft 40. The cross shaft 40 carries a number of tubular arms 41 equal in number to the number of stacks of labels 9 utilized in the particular machine. The tubular arms 41 are located in fixed positions on the cross shaft 40 by means of adjustable brackets 42 (FIGURE 8). At its lower end, each tubular arm 41 is provided with a terminal vacuum cup 43. These vacuum cups 43 are the elements that actually grasp individual labels 9 and carry the labels 9 to their intended positions about the necks of the bottles 8.

Vacuum pressure is supplied to the individual cups 43 by means of a transverse vacuum supply tube 44 carried on the cross shaft 40 by means of outwardly extending brackets 50 that extend almost opposite to the arms 41.

The interior of the tube 44 is connected to the interior of the respective tubular arms 41 by individual connecting hoses 45. The supply end of the tube 44 is connected by means of a larger flexible hose 46 to a vacuum pump 47 on the framework 10. The pump 47 is shown powered by a motor 48. The hose 46 might also be connected to an external source of vacuum pressure to provide the required vacuum at the cups 43. It is not necessary to provide a vacuum breaker in the connection to hose 46 as will be evident from the description to follow.

The first lever system comprised basically of the arms 35 is moved by a small cylinder 51 pivotally mounted at the left of the machine on a bracket 53 at the base of the cylinder 51. The reciprocable rod 52 of the cylinder 51 has its outer end connected to an extension 54 on the adjacent arm 35 by means of a pivot bracket 55. Thus, extension of the rod 52 will result in pivotal movement of the arms 35 about the axis of shaft 37 to a position wherein the arms 35 are adjacent to the outside labels 9 in the nested stack of labels. Retraction of the rod 52 will pivot the arms 35 to a position wherein they are adjacent to the bottles 8 on the conveyor.

Figure 6:
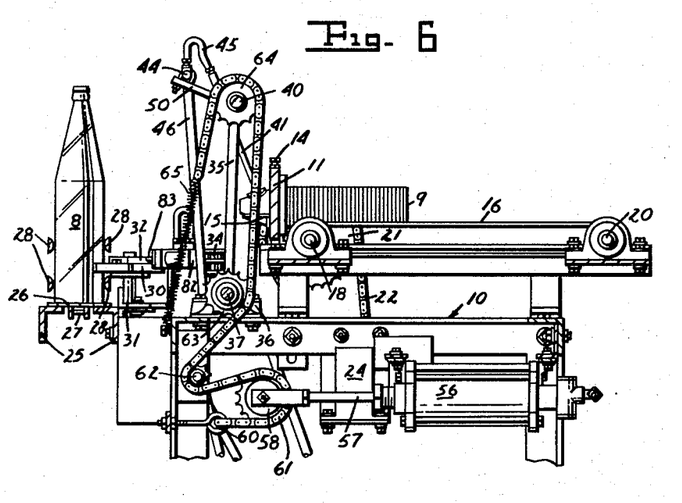
FIGURE 6 is a fragmentary sectional view taken along line 6—6 in FIGURE 5.
Figure 7:
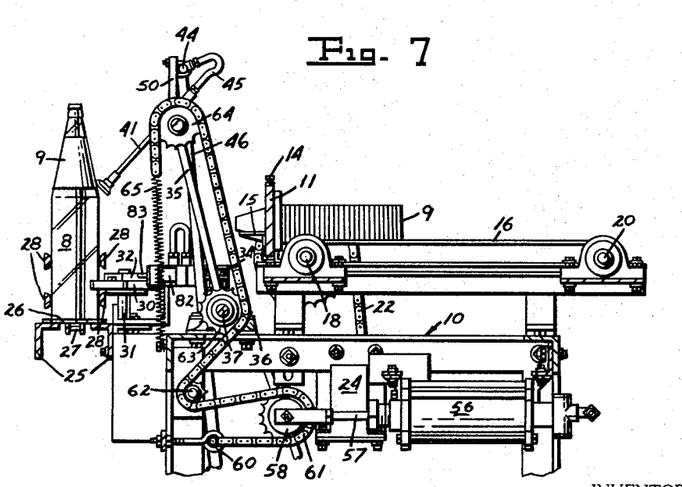
FIGURE 7 is a view similar to FIGURE 6, showing the label placement apparatus immediately after release of a label on a bottle.

The second lever system, which is carried by the first, is powered by means of a larger cylinder 56 fixed to the framework 10 and best seen in FIGURES 6 and 7, which illustrate its operation. The cylinder 56 is provided with a reciprocable piston rod 57 carrying a rotatable sprocket 58 at its outer end. The sprocket 58 is engaged by a chain 61 having one end anchored to the framework 10 at 60. The chain is first enmeshed about the sprocket 58 on the piston rod 57 and then passes over an idler sprocket 62 on the framework 10. It continues upwardly over an idler sprocket 63 rotatably journalled on the shaft 37 previously described. It then extends parallel to the arms 35 and over a sprocket 64 on the cross shaft 40. The sprocket 64 is fixed to the shaft 40, so as to turn in unison with it. Proper tension on the chain 61 is provided by a tension spring 65 connecting the remaining end of the chain 61 and the framework 10.

The chain 61 provides a positive mechanical connection between the rotatable cross shaft 40 and the powered pneumatic cylinder 56. The cylinder 56, as well as the cylinder 51, is a pneumatic double-acting cylinder of conventional manufacture. It will be seen from FIGURE 6 that extension of the piston rod 57 in the cylinder 56 will cause the shaft 40 to be rotatably turned in a counterclockwise direction as viewed in these figures. This is due to the tension of the spring 65. This will move the arms 41 to a location at which they will engage the outer labels 9 in the respective stacks of labels. Retraction of the rod 57 will cause the shaft 40 to be turned in a clockwise direction to raise the respective arms 41 to an elevation above that of the tops of the bottles 8.

*Operational controls*

The operations involved in placing the label 9 on the bottles 8 are entirely automatic. The precise details of the controls are not shown, since they utilize conventional control elements. However, the general nature of the control system is fully shown in the drawings.

The apparatus is primarily controlled by a second star wheel 66 rotatably mounted on the conveyor framework 25 at the left of the machine. The position of the star wheel 66 on the framework 25 is such that the number of bottles 8 between the previously described star wheel 30 and the star wheel 66 will be a multiple of the number of labels placed in each cycle of the machine. In the example illustrated, there are 18 bottles in this group, including the two bottles contacted by the respective star wheels 30 and 66. The star wheels 30 and 66 insure that there will be six bottles in stationary positions for reception of labels, six bottles having received labels and six more bottles being ready to receive labels at the completion of the current cycle.

The star wheel 66 is rotatably mounted on the framework 25 in the same manner as star wheel 30 for free rotation about a vertical axis. It also is six sided and has a periphery with indentations complementary to the bottles 8. The top of the star wheel 66 has finger 67 fixed to it adapted to engage the actuating button of a switch 68 fixed relative to the framework 25.

It can be seen from FIGURE 5 that rotation of the star wheel 66 will actuate the switch 68 once during each revolution. Actuation of switch 68 will occur when the desired 18 bottles are located between the star wheels 30 and 66, at which time all 18 bottles will be stationary due to the engagement of the finger 32 by the plunger 83. The switch 68 is connected to a solenoid controlled pneumatic valve operatively connected to the large lower cylinder 56. Actuation of switch 68 will result in retraction of piston rod 57 within the cylinder 56 and will therefore swing the arms 41 upwardly in a clockwise direction as they are seen in FIGURE 6.

Another control switch 71 is mounted on the framework 10 at the left side of the apparatus. The actuating button for the switch 71 is selectively energized by a protruding finger 70 fixed to the shaft 40. The finger 70 will actuate switch 71 when the arms 41 have reached their uppermost position. Switch 71 is operatively connected to a solenoid controlled pneumatic valve that operates the small cylinder 51. Actuation of switch 71 results in retraction of the piston rod 52 within cylinder 51 and will therefore swing the arms 35 in a counterclockwise direction about the lower shaft 37 as shown in FIGURES 6 and 7.

Figure 3:
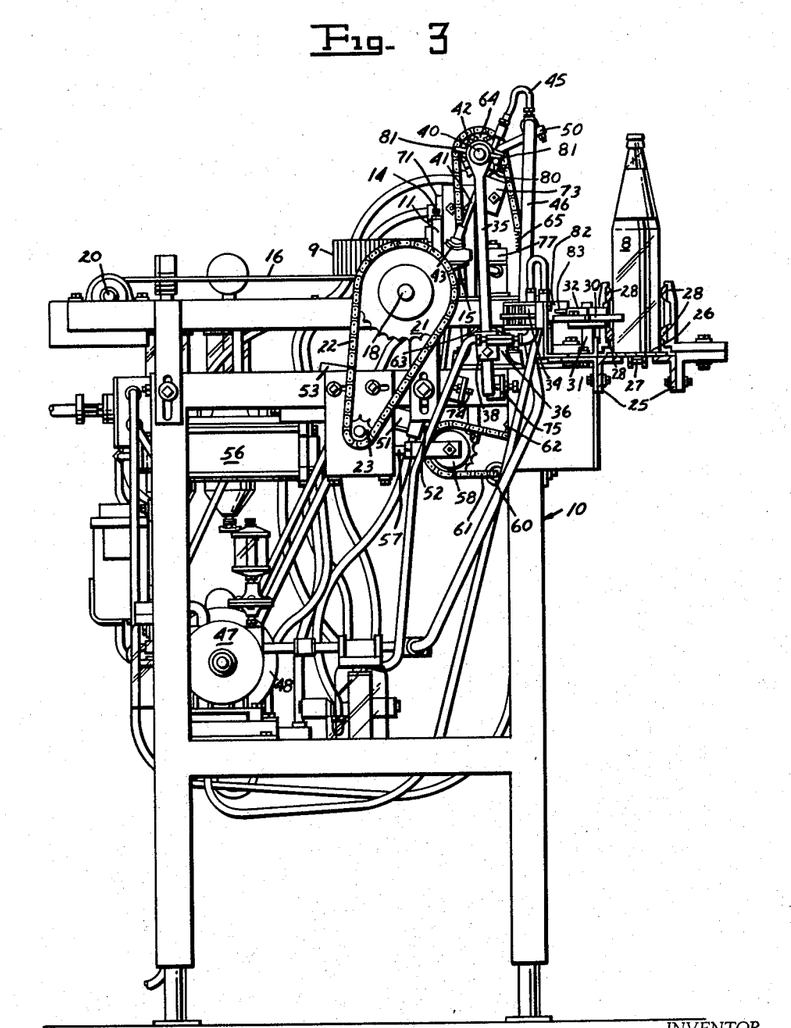
FIGURE 3 is a side view opposite to FIGURE 2.
Figure 4:
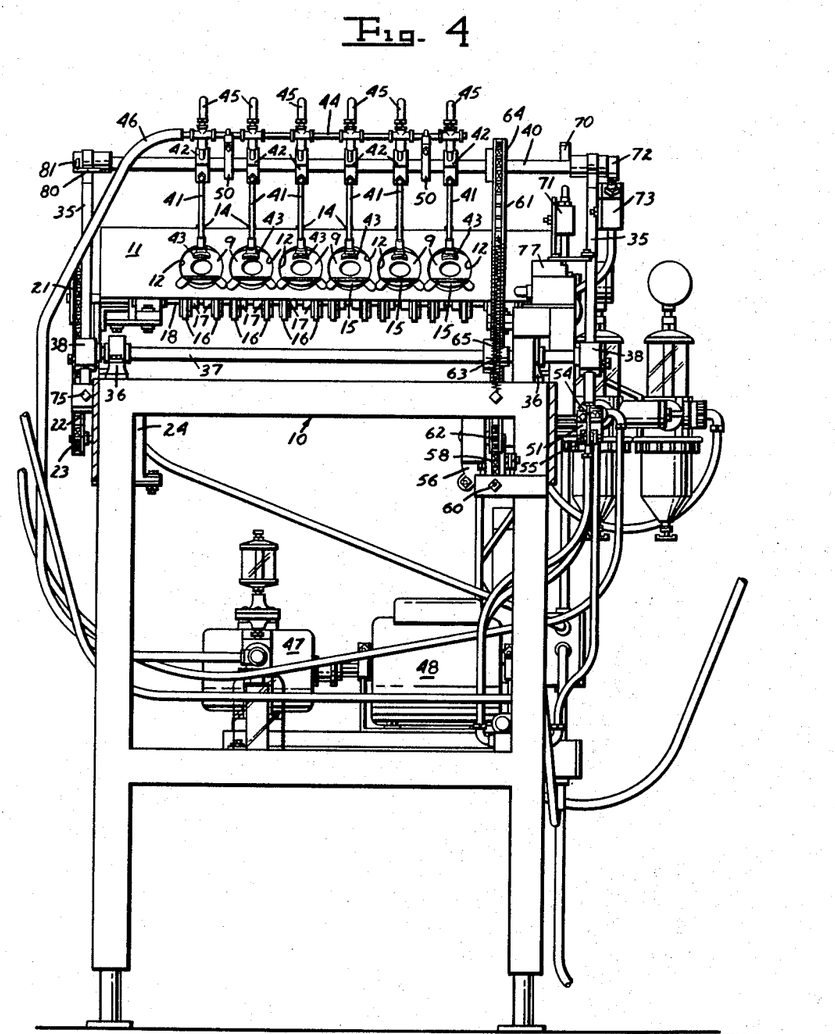
FIGURE 4 is a rear sectional view taken along line 4—4 in FIGURE 2.

Pivotal movement of the arms 35 is mechanically limited by fixed stops 74 and 75 on the framework 10, best seen in FIGURE 3. In the same manner, mechanical limits are provided at the right side of the machine for positively limiting pivotal movement of the upper cross shaft 40. This mechanical stop comprises a pin 80 mounted on arm 35 alternately abutted by radially protruding pins 81 fixed to the shaft 40.

Figure 1:
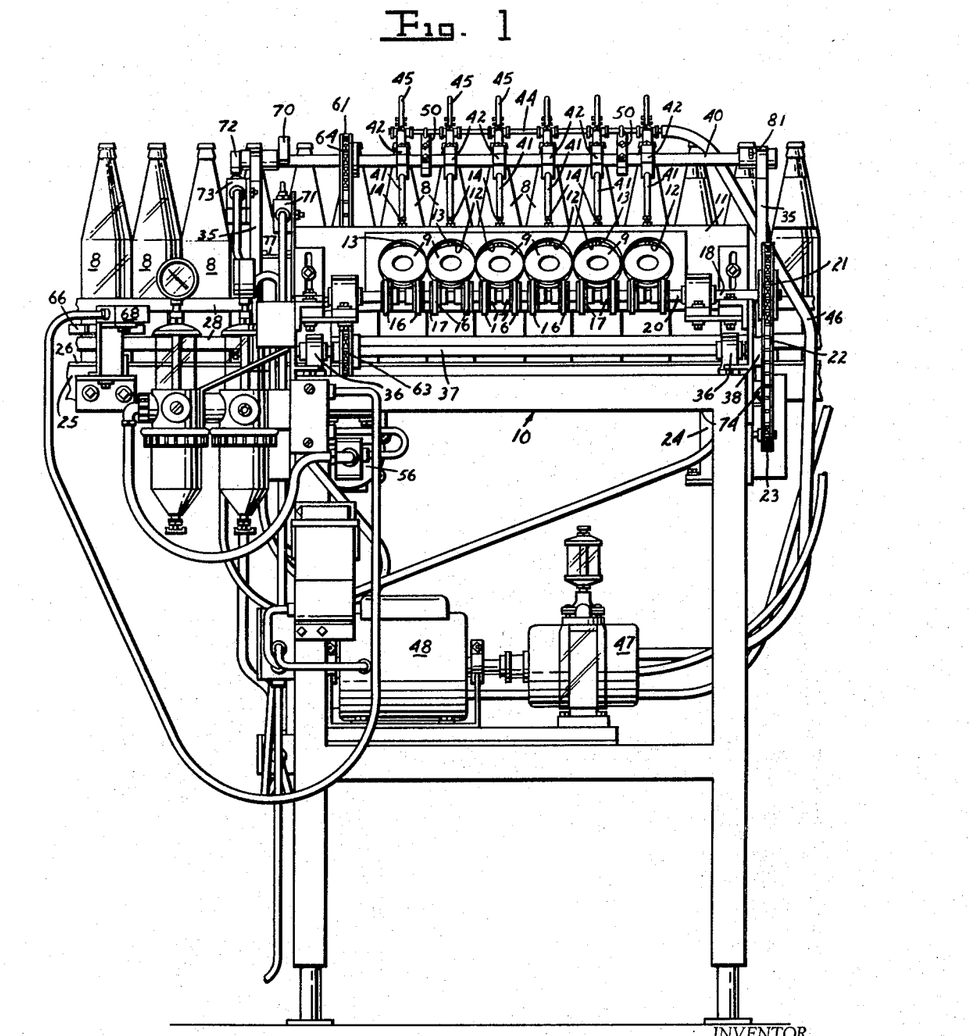
FIGURE 1 is a front view of the machine showing a longitudinal portion of the conveyor at the rear of the machine on which bottles are located.
Figure 2:
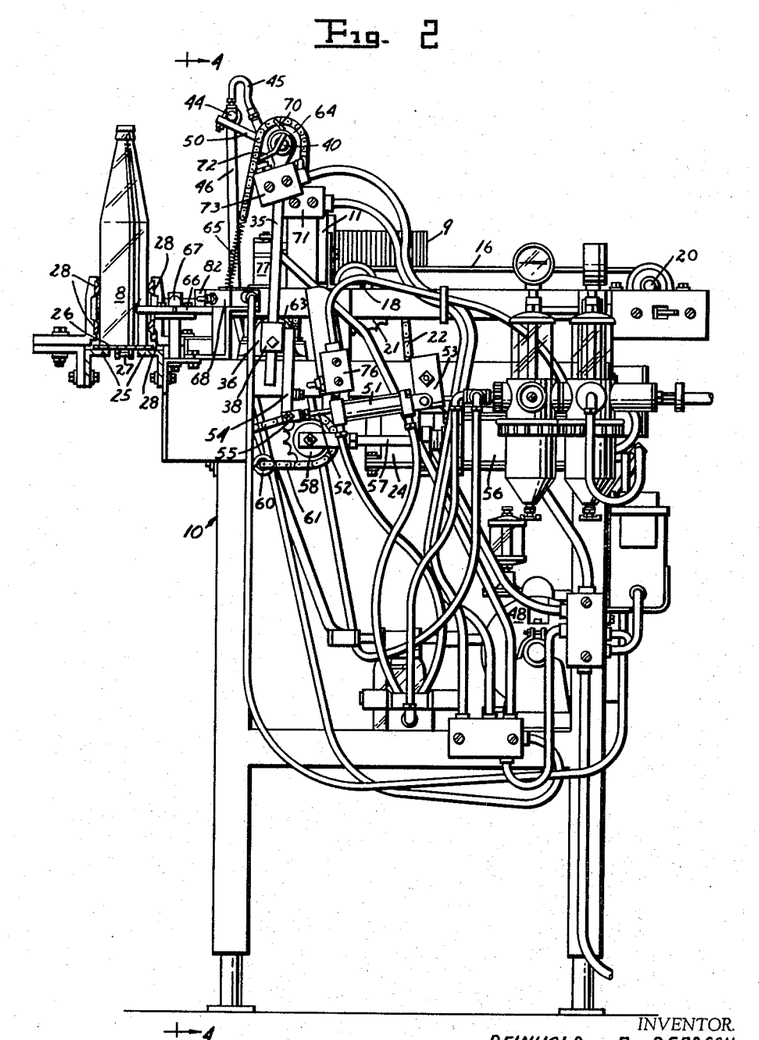
FIGURE 2 is a side view taken from the left in FIGURE 1.

When the arms 35 have moved to their position adjacent to the bottle conveyor, the lower extension 54 on the left hand arm 35 will contact the button of a switch 76 mounted on the framework 10 (FIGURE 2). The switch 76 is connected to the same solenoid controlled pneumatic valve assembly to which switch 68 is connected and serves to reverse the pneumatic connections to the large cylinder 56 to therefore extend the piston rod 57 outwardly. This will cause the upper cross shaft 40 and the arms 41 to pivot around the axis of shaft 40 in a counterclockwise direction as seen in FIGURES 6 and 7.

Another radially protruding finger 72 extending from the shaft 40 is adapted to contact a final control switch 73 mounted on the left hand arm 35 (FIGURE 2). The switch 73 is connected to the same solenoid controlled pneumatic cylinder to which switch 71 is connected and will reverse the pneumatic connections to the small cylinder 51 to therefore extend the piston rod 52 and swing the arms 35 in a clockwise direction about their pivotal shaft 37.

One additional switch is shown on the framework 10 and is designated by the numeral 77. The actuating arm for switch 77 lies in the path of movement of the left hand arm 35 and can best be seen in FIGURE 5. Switch 77 will be tripped by the return motion of the arm 35 to the initial position as shown in FIGURE 6. The switch 77 operates solenoid valve 34 to retract the plunger 83 in the cylinder 82 and therefore allow star wheel 30 to freely turn one revolution. The valve 34 is controlled by a timed delay solenoid valve and holds the plunger 83 in a retracted position for a sufficient time to permit the finger 32 to clear the plunger 83.

*Operation*

Figure 9:
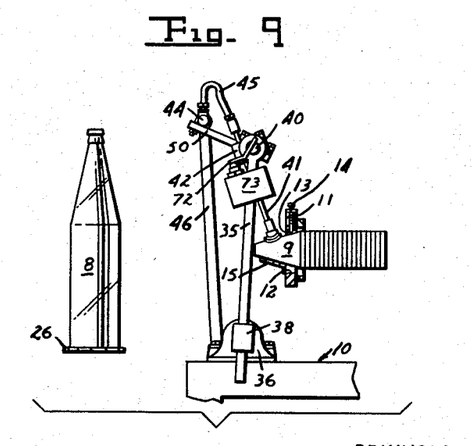
FIGURE 9 shows the initial grasping of a label by the vacuum cup.

It is believed that the complete operation of the machine during one cycle can best be understood from the schematic drawings shown in FIGURES 9 through 12. FIGURE 9, as well as FIGURES 1 through 6, show the apparatus in what might be termed its "rest" position. This is the position to which the automatic controls will return all of the various elements. In this condition, the vacuum cups 43 are in contact with the upper exposed surfaces of the outer labels 9 in each stack of nested labels protruding through the die aperture 12. The piston rods 52 and 57 of the respective cylinders 51 and 56 are in their extended positions. The arms 35 are located adjacent to the nested stack of labels 9. The plunger 83 of the cylinder 82 will be in abutment with the finger 32 on star wheel 30 and therefore prevent movement of the bottles 8 on the conveyor plates 26.

When bottles are completely arranged in abutting positions across the framework 10 and the incoming or left star wheel 66 has been turned by six incoming bottles, the finger 67 will actuate switch 68. Actuation of the switch 68 will cause the large lower cylinder 56 to retract its piston rod 57 and will therefore cause the top cross shaft 40 to be rotated in a clockwise direction, at the same time pulling from the nested stacks of labels the outer labels 9 contacted respectively by the vacuum cups 43.

Figure 10:
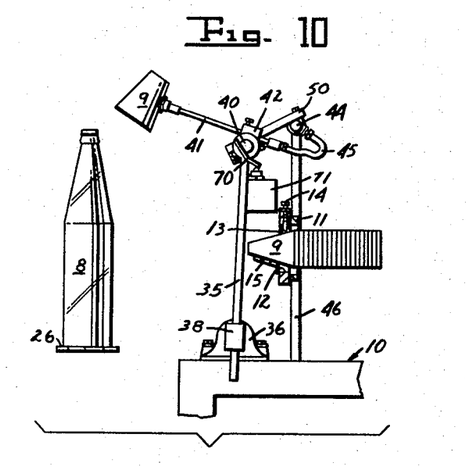
FIGURE 10 shows the label directed at an elevation above the top of the bottle.

The retraction of the cylinder rod 57 will cause the arms 41 to be elevated to the position shown diagrammatically in FIGURE 10. In this position the radial finger 70 on the shaft 40 will actuate the switch 71. Switch 71 will cause retraction of the piston rod 52 in the small cylinder 51. This will result in the arms 35 being swung in a counterclockwise direction until they attain the position shown in FIGURE 11. At this position, the arms 35 will be located adjacent to the bottles 8 on the passing conveyor and the labels 9 grasped by the vacuum cups 43 will be positioned directly above the conveyor and over the top ends of the respective bottles on which they are to be placed.

Figure 11:
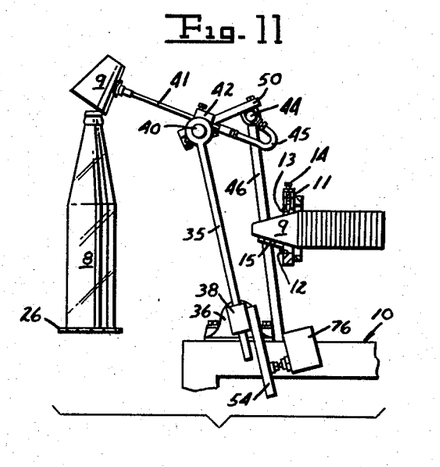
FIGURE 11 shows the label moved over to a location directly above the bottle neck.
Figure 12:
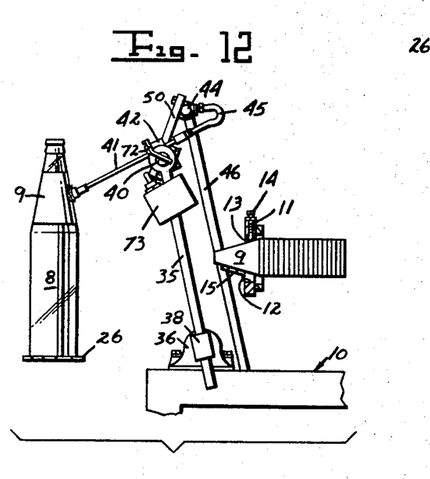
FIGURE 12 shows the placement of the label on the neck of the bottle immediately prior to release of the label.
Figure 13:
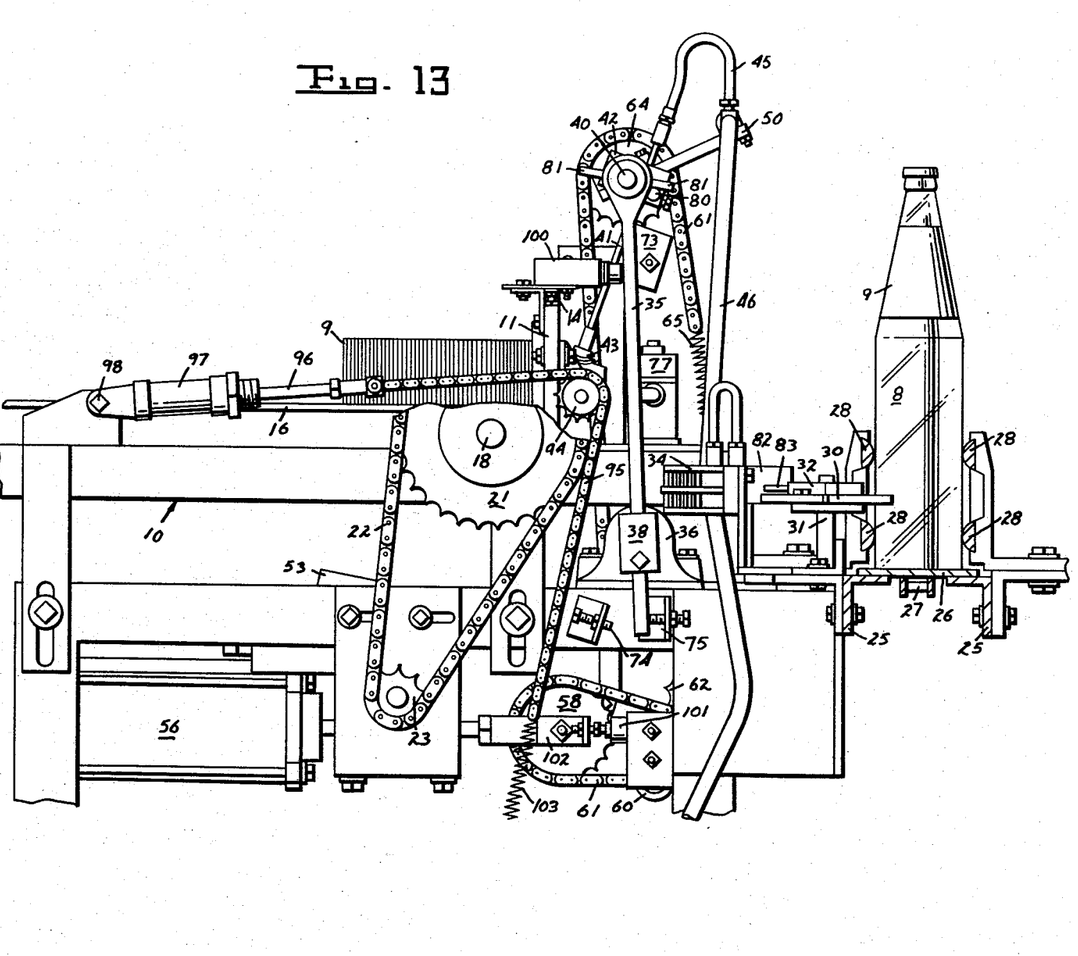
FIGURE 13 is an enlarged view similar to the upper portion of FIGURE 3, showing a modified embodiment of the machine, portions of the machine being broken away to better illustrate the modified details.
Figure 14:
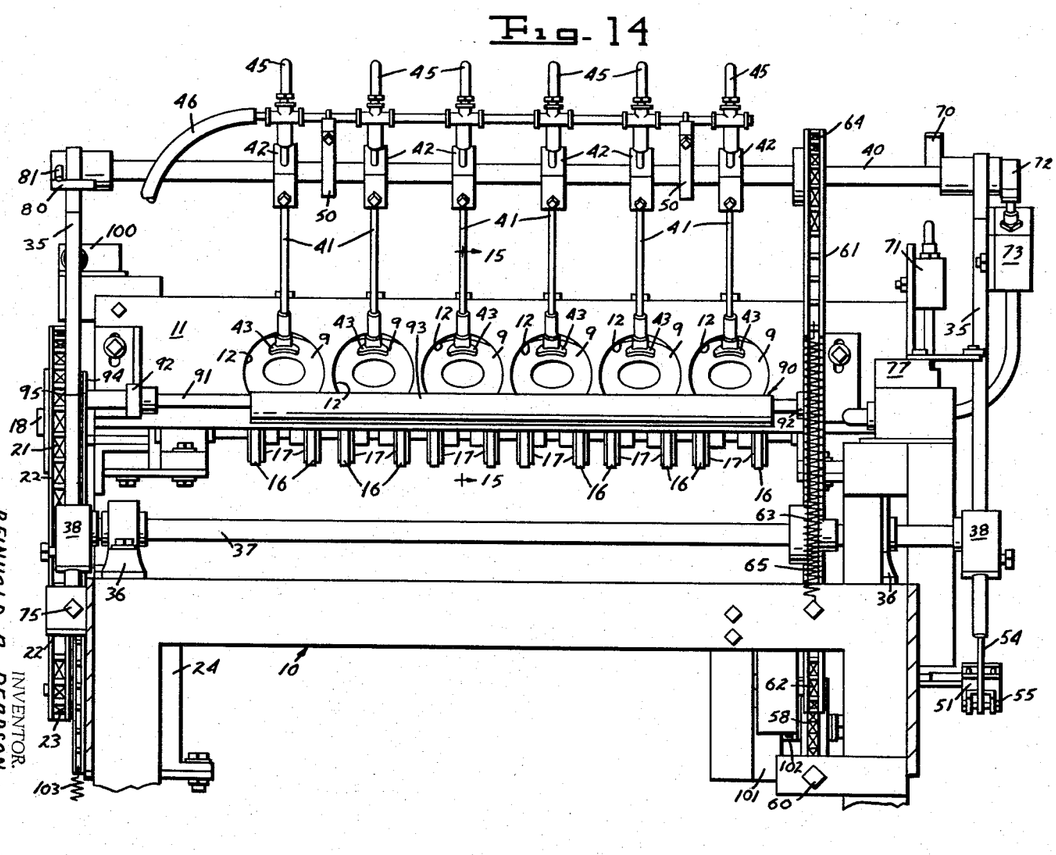
FIGURE 14 is an enlarged view similar to the upper portion of FIGURE 4, illustrating the modifications shown in FIGURE 13.

When the arms 35 reach the position shown in FIGURE 11, the switch 76 will be actuated to reverse the pneumatic connections to the large cylinder 56. This will cause the top cross shaft 40 to be rotated in a counterclockwise direction, bringing the respective arms 41 downwardly adjacent to the surfaces of the bottles with which they are aligned. As shown in FIGURE 12, this will first cause the labels 9 to be placed over the necks of the bottles 8. However, the rotational movement of the arms 41 will continue past the position shown in FIGURE 12 and as the cups 43 sweep downwardly, movement of the respective labels 9 will be prevented due to engagement with the bottles 8 on which they have been placed. The vacuum cups 43 will then slide over the surfaces of the labels 9 and finally release as shown in FIGURE 7.

The sweeping motion of vacuum cups 43 is extremely important in placing labels 9 solidly on the bottles 8. Adhesives can be used to secure the labels 9 on the bottles 8, the adhesive being applied either to the labels 9 or the bottles 8 prior to placement of the labels on the bottles. In any event, it is desirable to securely place the labels 9 so that they will not become dislodged in later mechanical loading operations. The arms 41 will continue past the position shown in FIGURE 7 and back to their initial positions relative to the supporting arms 35. At this time the finger 72 will actuate switch 73 to cause a reversal of the pneumatic connections to the small cylinder 51. This will result in the piston rod 52 being extended to pivot the arms 35 in a clockwise direction back to their initial positions shown in FIGURE 9.

As the arms 35 return to their initial positions, the left hand arm will trip the switch 77 momentarily and actuate the time delayed solenoid valve 34. The solenoid valve 34 will therefore cause the cylinder 82 to retract plunger 83 long enough to insure passage of the finger 32 past the plunger 83 so that six bottles will then move on the conveyor plates 26 past the center of the star wheel 30 before the bottles are again stopped by reengagement of finger 32 by plunger 83. Again, contact of six bottles by the star wheel 66 will cause the finger 67 to engage switch 68 and repeat the cycle just described.

It will thus be seen that the present machine is completely automatic and that the only manual operation involved is the placement of nested stacks of labels 9 on the supporting belts 16 that urge them toward the die 11. The operations involved in this machine will operate in a time sequence depending upon the feed of bottles to the machine. If the bottles are coming continuously, the speed of the conveyor plates 26 will govern the speed of the cycle. If the flow of bottles should be interrupted, the label placement apparatus will not be activated until a sufficient number of bottles are in proper places on the conveyor adjacent to the framework 10.

*Modification of FIGURES 13 to 16*

Illustrated in FIGURES 13 through 16 is a modification of the device previously described, providing a mechanical implement to positively separate the individual labels as they are being grasped by the vacuum cups 43.

Since the basic features of the apparatus previously described remain unchanged in this modified form of the machine, the same reference numerals previously applied to the various elements of the machine are used in the designations required in FIGURES 13 to 16.

In addition to the elements previously disclosed, this form of the machine utilizes a longitudinal cam 90 located transversely on the framework directly beneath the outer label 9 in each stack of labels. Cam 90 is positioned beneath the outer labels 9, in opposition to the contact of these labels by the respective vacuum cups 43. Cam 90 comprises a mounting shaft 91 rotatably carried by adjustable bearings 92 at each of its ends and having fixed thereto a hollow tube 93 which is the actual cam element. The axis of tube 93 is radially offset from the axis of shaft 91, to provide a varying outer cam surface relative to the rotational axis of shaft 91.

Shaft 91 is provided with a sprocket 94 at one end thereof (FIGURE 13) which is pivoted by means of a chain 95 connected to the piston rod 96 of a single acting pneumatic cylinder 97. Cylinder 97 is pivoted to the framework at 98. The opposite end of chain 95 is connected to to a tension spring 103 suitably anchored to the framework so as to pull chain 95 in opposition to cylinder 97.

Cylinder 97 is controlled by two switches wired in series. The first switch 100 is mounted in a fixed position on the framework so as to be contacted by the adjacent arm 35 when arm 35 is in its position adjacent the outer labels 9. The second switch 101 is fixed to the lower portion of the framework so as to be contacted by the bracket 102 that carries sprocket 58 when the piston rod 57 of cylinder assembly 56 is fully extended.

Figure 15:
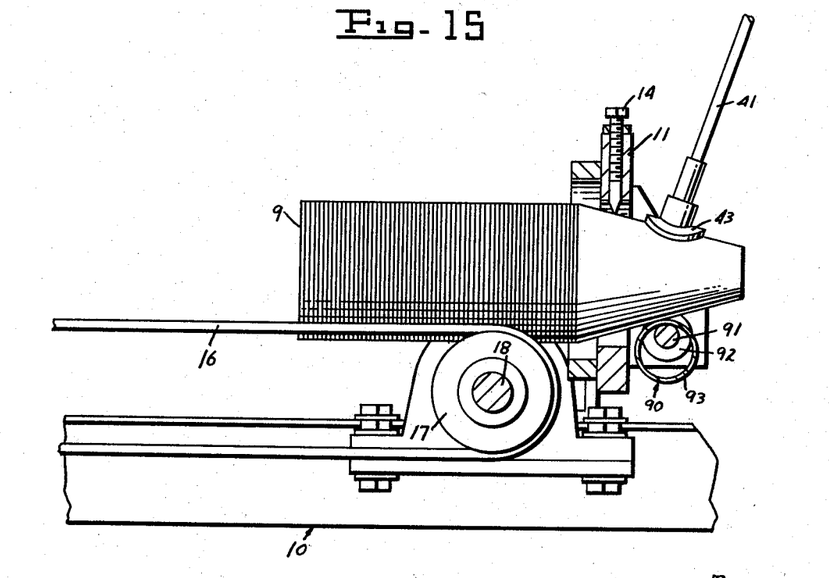
FIGURE 15 is an enlarged fragmentary sectional view taken along line 15—15 in FIGURE 14, showing the modified structure.

The operation of the apparatus is very simple. Both switches 100 and 101 must be contacted before cylinders 97 can pull on the piston rod 96 and rotate cam 90 upwardly into contact with the outer labels 9. At all other times, the position of cam 90 is as shown in FIGURE 15, adjacent to the outer labels 9, but not applying pressure to them.

Figure 16:
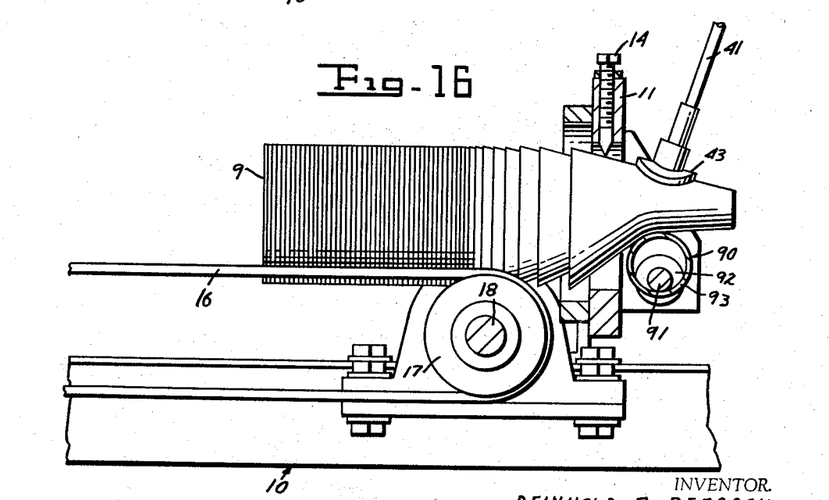
FIGURE 16 is a view similar to FIGURE 15, showing the operation of the movable cam to separate the individual labels.

When the arms 35 have been moved back toward the outer labels 9 and the bracket 102 is fully extended so that the vacuum cups 43 are in grasping contact with the outer labels 9 (FIGURE 15) the two switches 100 and 101 will both be closed and the cam 90 will instantly be swung to the position shown in FIGURE 16 by contraction of piston rod 96. The movement of cam 90 will cause its outer surface along the tube 93 to press upwardly against the outer label 9 (FIGURE 16) in opposition to the pressure applied to the outer label 9 by the contacting vacuum cup 43. This will cause the label 9 to be squeezed inwardly, forcing all other labels back to separate them from the label contacted by vacuum cup 43. This has been found to be extremely useful where labels tend to stick to one another due to adhesive, printing inks or static electricity. The operation of the machine is unchanged. The instant that the bracket 102 begins to move to initiate motion of vacuum cups 43, switch 101 will be released and the spring 96 will return the cam 90 to the position shown in FIGURE 15 so that the outer label 9 can be moved freely as previously described.

Figure 17:
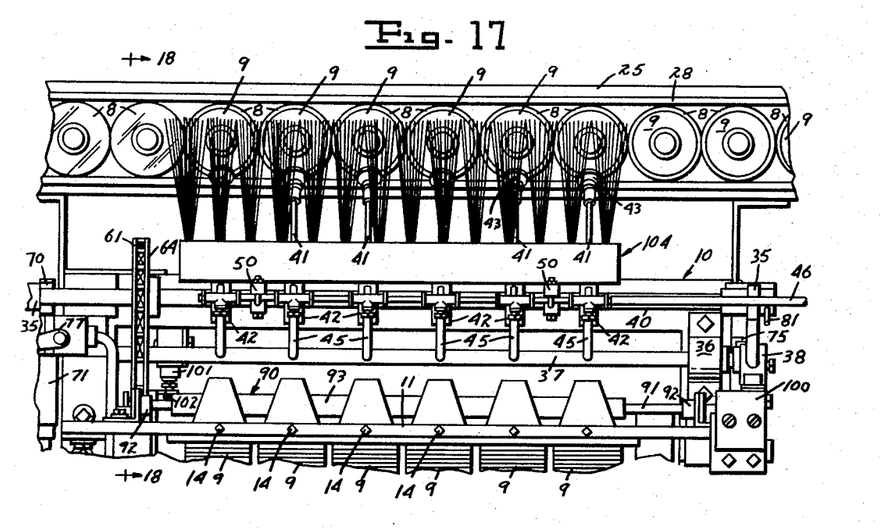
FIGURE 17 is a fragmentary top view of the rear of the apparatus, illustrating a further modification thereof.
Figure 18:
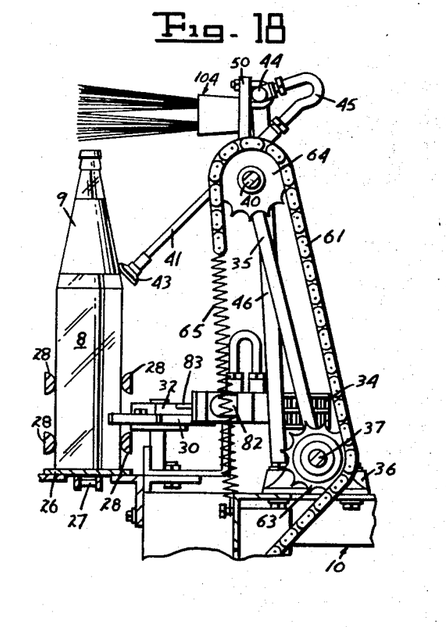
FIGURE 18 is a fragmentary sectional view taken along line 18—18 in FIGURE 17.
Figure 19:
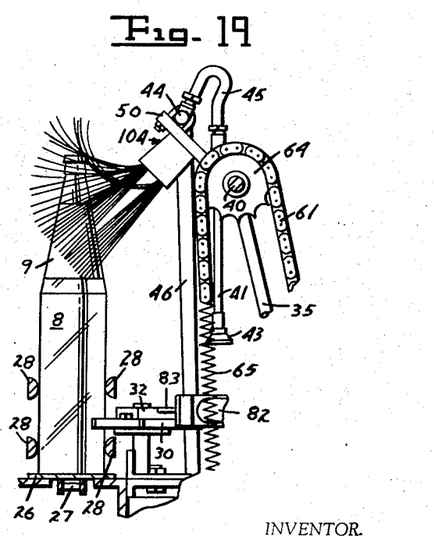
FIGURE 19 is a fragmentary view similar to FIGURE 18, illustrating the operation of the brush utilized in the modification.

*Modification of FIGURES 17 to 19*

In FIGURES 17 to 19 is disclosed a further attachment that has proven useful in properly securing the labels on the necks of bottles 8. This attachment merely comprises a long bristled brush 104 which is fixed to the previously described brackets 50. The brush 104 extends across the operating width of the machine, slightly beyond the cups 43 at each side thereof. The length of the bristles of brush 104 are such that they will sweep downwardly along each label 9 after placement of the label on a bottle 8 in the manner shown in FIGURE 19. This frictional engagement of the yieldable brush bristles further insures proper engagement of the labels 9 on the bottles 8 and the operation of the machine is not changed in any manner by this addition. The reference numerals previously utilized in the description of the machine are also applied in FIGURES 17 through 19.

It is to be understood that the control mechanisms described herein are not intended to limit the application of control devices to this machine. The machine has been successfully built with both electrical controls as illustrated and with purely pneumatic controls to operate the various cylinders directly upon the application of mechanical contact by the machine parts.

The apparatus just described automatically places labels over the necks of the bottles in secure accurate positions with each label being individually handled and its proper positioning on the bottle 8 being mechanically insured.

The device is simple from a mechanical standpoint but does a highly effective job in locating and placing paper labels, which are not very substantial on an individual basis.

The specific mechanical structure shown in the drawings is only illustrative, and the invention is not to be restricted to this illustrative structure except as it is defined in the following claims.

Having thus described my invention, I claim:

1. An apparatus for placing tapered sleeve labels over the neck of a bottle, comprising:
   a supporting framework;
   bottle conveying means on said framework to move bottles relative to said framework;
   label feed means on said framework to individually locate a stack of nested labels with the outer label thereof at a predetermined position relative to said framework, the outside surface of the outer label being at least partially exposed;
   label placement means on said framework to selectively grasp the outside surface of the outer label positioned by said label feed means and to place it about the neck of a bottle on said bottle conveying means;
   brush means on said label placement means to sweep downwardly over each label after placement thereof about the neck of a bottle on said bottle conveying means.

2. An apparatus as set out in claim 1 wherein said label placement means comprises:
   first lever means pivotally mounted on said framework for motion between a first position adjacent to the predetermined position of the outer label in a stack located by said label feed means and a second position adjacent said bottle conveying means;
   second lever means pivotally mounted on said first lever means;
   vacum cup means at one end of said second lever means to selectively grasp the outer surface of an individual lever;
   and a source of vacuum pressure operatively connected to said vacuum cup means;
   said brush means being mounted on said second lever means including bristles extending radially outward therefrom angularly offset with relation to said vacuum cup means, said brush means being adapted to sweep downwardly against each label as placed by said vacuum cup means.

3. An apparatus for placing tapered sleeve labels over the neck of a bottle comprising:
   a supporting framework;
   bottle conveying means on said framework to move bottles relative to said framework;
   label feed means on said framework to individually locate a stack of nested labels with the outer label thereof at a predetermined position relative to said framework, the outside surface of the outer label being at least partially exposed;
   label placement means on said framework to selectively grasp the outside surface of the outer label positioned by said label feed means and to place it about the neck of a bottle on said bottle conveying means;
   said label placement means comprising:
   first lever means pivotally mounted on said framework for motion between a first position adjacent to the predetermined position of the outer label in a stack located by said label feed means and a second position adjacent said bottle conveying means;
   said second lever means pivotally mounted on said first lever means;
   vacuum cup means at one end of said second lever means to selectively grasp the outer surface of an individual lever;
   a source of vacuum pressure operatively connected to said vacuum cup means; and
   movable cam means on said framework positioned adjacent to the predetermined position of the outer label in a stack located by said label feed means to apply pressure against said outer label in opposition to said vacuum cup means after contact of the outer label by said vacuum cup means.

4. An apparatus for transferring individual sleeve labels from a nested stack and placing them individually about the necks of bottles on a conveyor, comprising:

a rigid supporting framework located in a fixed position adjacent to the bottle conveyor;

feed means on the conveyor to hold the nested sleeve labels with the outer label thereof in a predetermined location relative to the framework;

first means mounted on said framework movable between a first position adjacent to the conveyor and a second position adjacent to the predetermined location of the outer label in a stack;

second means mounted on said first means for motion relative thereto;

vacuum cup means on said second means to selectively grasp the outside surface of an outer label in a stack;

a source of vacuum pressure operatively connected to said vacuum cup means;

first operating means on said framework operatively connected to said first means to effect movement of said first means between its first and second positions;

second operating means on said framework operatively connected to said second means to move said second means relative to said first means between a first position at which said vacum cup means contacts the outside surface of a label at the predetermined location when said first means is at its second position and a second position with a vacuum cup extended out over the conveyor when said first means is at its first position;

movable cam means mounted on said framework adjacent to the outside surface of a label at the predetermined location in opposition to contact thereof by said vacuum cup means to selectively apply pressure against the adjacent label surface.

5. An apparatus for transferring individual sleeve labels from a nested stack and placing them individually about the necks of bottles on a conveyor, comprising:

a rigid supporting framework located in a fixed position adjacent to the bottle conveyor;

feed means on the conveyor to hold the nested sleeve labels with the outer label thereof in a predetermined location relative to the framework;

first means mounted on said framework movable between a first position adjacent to the conveyor and a second position adjacent to the predetermined location of the outer label in a stack;

second means mounted on said first means for motion relative thereto;

vacuum cup means on said second means to selectively grasp the outside surface of an outer label in a stack;

a source of vacuum pressure operatively connected to said vacuum cup means;

first operating means on said framework operatively connected to said first means to effect movement of said first means between its first and second positions;

second operating means on said framework operatively connected to said second means to move said second means relative to said first means between a first position at which said vacuum cup means contacts the outside surface of a label at the predetermined location when said first means is at its second position and a second position with a vacuum cup extended out over the conveyor when said first means is at its first position;

and brush means mounted on said second means for movement therewith, said brush means being angularly displaced relative to said vacuum cup means to follow the vacuum cup means during movement of said first means from its first position to its second position.

References Cited
UNITED STATES PATENTS

| | | | |
|---|---|---|---|
| 1,971,576 | 8/1934 | Nelson | 29—211 X |
| 2,852,899 | 9/1958 | Murrell | 29—208 |
| 3,267,566 | 8/1966 | Ovellette | 29—208 |

THOMAS H. EAGER, *Primary Examiner.*